June 24, 1930.   J. J. PAUGH   1,767,473
WELDING MACHINE
Filed March 3, 1928

Inventor
JAMES J. PAUGH
By John P. Larbof
Attorney

Patented June 24, 1930

1,767,473

UNITED STATES PATENT OFFICE

JAMES J. PAUGH, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

WELDING MACHINE

Application filed March 3, 1928. Serial No. 258,783.

My invention relates to welding machines of the spot welding type.

These machines are commonly manufactured for operation of the electrodes in a substantially vertical direction, the work at the point of engagement by the electrodes extending horizontally. The principal object of my invention is to enable such standard machines to be used without consequential change of position, or alteration of the principal parts for horizontal welding. In other words, my object is to enable the standard machines to be utilized for the welding of working extending at the point of engagement with the electrodes at angles to the horizontal direction.

Very commonly, prior to my invention, it has been the practice either to employ specially built machines which are very expensive, or to change the attitude of the standard machine to the angular attitude desired, an operation which is not only expensive, but requires very considerable labor and space. With this latter expedient, there are used special mounting devices or special bases, columns or pedestals are often required and, of course, the machines themselves are of very great weight, thus increasing the difficulties involved. All of these expedients and expenses are eliminated by my invention.

In addition, my invention makes it possible to utilize the standard machine entirely, enables this utilization to be effected without changing the normal mounting or position of the machine, or even its location, and results in a machine affording an even greater accessibility, adaptability and efficiency than either the specially built machine or the machine subjected to the expedient of changing attitude and location.

In the accompanying drawings.

The standard welding machine commonly makes use of a substantially vertically extending main pedestal 10, and at its upper end of an integrally extending substantially horizontal overhanging arm 11. Extending from the main pedestal 10 below the upper arm 11 is a vertically adjustable but normally fixed arm 12 which carries a fixed electrode. The outer end of the horizontally extending arm is substantially vertically faced off as at 13, and provided with a substantially vertically operating electrode actuating mechanism 14. This actuating mechanism comprises a head within which is vertically reciprocable column 15 which constitutes the upper electrode support.

Figure 2:
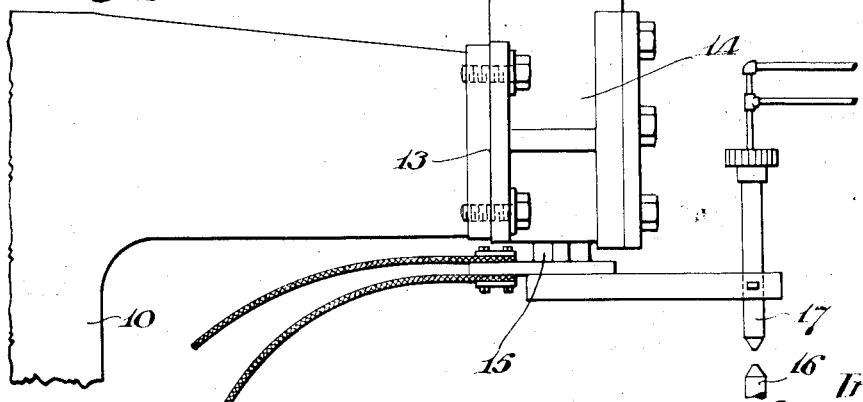
Fig. 2 shows a portion of one of the older standard machines.

Fig. 2 shows this general arrangement of the standard machine. The fixed and movable electrodes 16 and 17 supported respectively, from the arm 12 and the column 15, coact substantially vertically.

Figure 1:
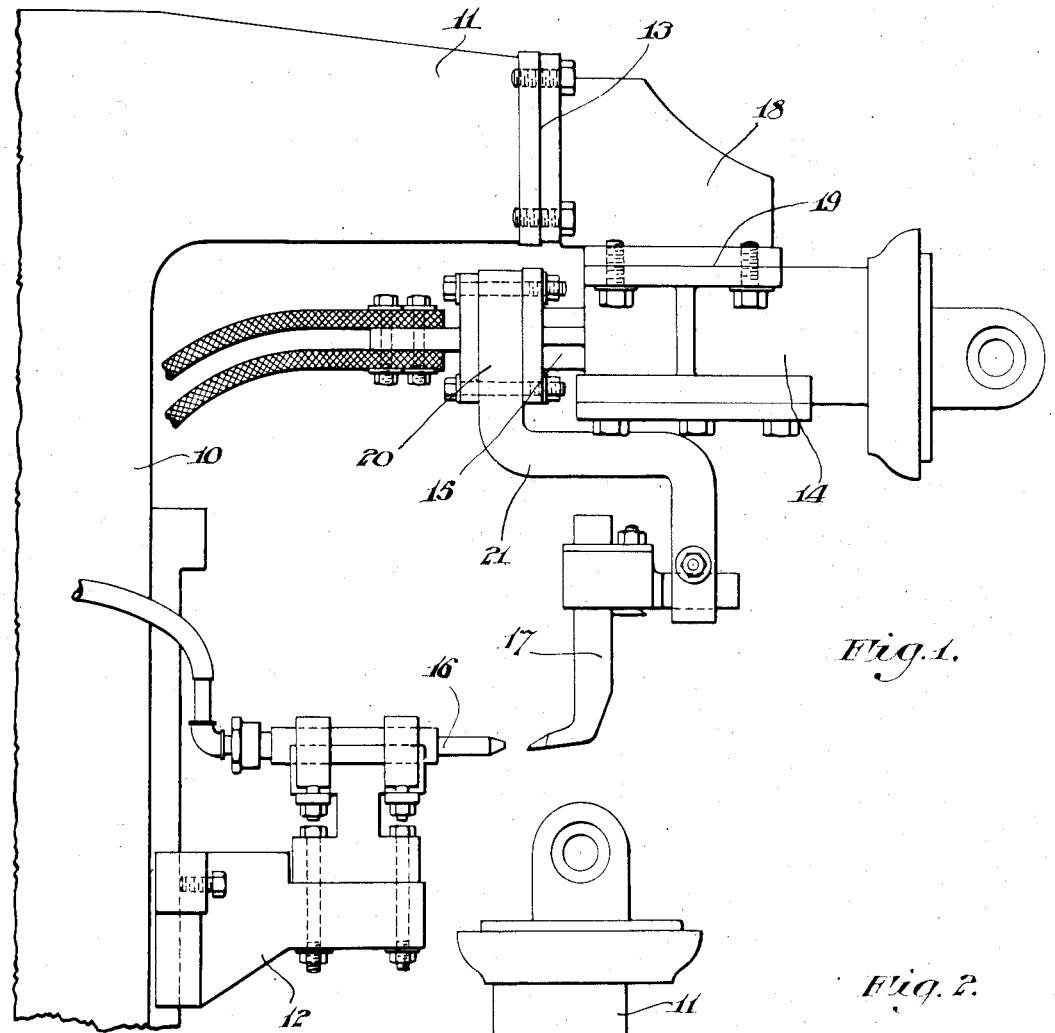
Fig. 1 shows the machine of my invention in the best form now known to me.

According to my invention I support the lower electrode 16 (see Fig. 1) in a substantially horizontal direction from the lower arm 12. In the embodiment shown it points outwardly, but it may point inwardly. Further, I remove the head 14 from the vertically extending face 13 of the arm 11 and interposes between it and the face 13 an angle bracket 18 of substantially angular form. The angle bracket 18 I removably bolt to the face 13, and the head 14 I removably bolt to the under face of the angle bracket 18. The arrangement of the faces and bolts is such that the head 14 may be interchangeably used either on the face 13 or on the face 19 of the angle bracket. In the embodiment shown, the head 14 has been in effect turned clockwise through substantially right angle. Thus the column 15 has an actuating movement in a substantially horizontal direction. Electrode 17 I support in juxtaposition to electrode 16 from the inner end 20 of column 15. This inner end is removed inwardly of the outer end 13 of the arm 11. At the same time by the use of the reversely offset extension 21, electrode 17, while supported at 20 inwardly of the arm 11, is actually offset outwardly thereof.

In such an arrangement I realize fully the advantages of my invention. Any standard machine whatsoever may be immediately converted in a few minutes from the vertically operating type to the horizontally operating type, merely by unbolting a vertical extending head 17 and interposing bracket 18 as shown. It may be immediately reconverted upon the completion of any given job. The heads of any horizontally operating machines are interchangeable with those of any vertically operating machines. Still further, merely by changing an angle of the bracket 18, substituting a bracket of one angular form for one of another angular form, the direction of operation of the electrodes may be changed, that is to say, through suitable adjustment the work may be done of different angles to the vertical or horizontal, as the case may be. For slight adjustment of the fixed electrode 16, or the fixed arm 12, ordinary slight adjustment of the angle of the fixed electrode 16 is sufficient.

Not only the modifications of my invention indicated, but others of greater and less import will fall within its generic spirit. All of them should be covered by the annexed claims.

What I claim is:

1. A welding machine comprising a substantially vertical main pedestal having a horizontal overhanging arm at its upper end, a lower electrode horizontally supported from the main pedestal, a relatively movable upper electrode supported from and in depending relation to said overhanging arm, and means for effecting a straight line movement of said upper electrode toward and away from said lower electrode.

2. A welding machine comprising a substantially vertically extending main pedestal and a horizontally extending arm at the upper end of said pedestal, together with electrodes having a substantially rectilinear movement of approach and separation, one of which electrodes is supported from said main pedestal, and the other of which is supported from said horizontally extending arm.

3. A welding machine comprising a substantially vertically extending main pedestal and a horizontally extending arm at the upper end of said pedestal, together with electrodes having a substantially rectilinear movement of approach and separation, one of which electrodes is supported from said main pedestal, and the other of which is supported from said horizontally extending arm through the intermediary of a stationary angle bracket.

4. A welding machine comprising a substantially vertically extending main pedestal and a horizontally extending arm at the upper end of said pedestal, together with electrodes having a substantially rectilinear movement of approach and separation, one of which electrodes is supported from said main pedestal, and the other of which is supported from said horizontally extending arm through the intermediary of an angle bracket removably secured in fixed relation to the outer end of said arm.

5. A welding machine comprising a substantially vertically extending main pedestal and a horizontally extending arm at the upper end of said pedestal, together with electrodes having a substantially rectilinear movement of approach and separation, one of which electrodes is supported from said main pedestal, and the other of which is supported from said horizontally extending arm, the electrode supported from the main pedestal pointing outwardly, and that supported from the arm pointing inwardly and supported inwardly of the outer end of said arm.

6. A welding machine comprising a substantially vertically extending main pedestal and a horizontally extending arm at the upper end of said pedestal, together with electrodes having a substantially rectilinear movement of approach and separation, one of which electrodes is supported from said main pedestal, and the other of which is supported from said horizontally extending arm, the electrode supported from the main pedestal pointing outwardly, and that supported from the arm pointing inwardly and supported inwardly of the outer end of said arm, but offset outwardly of its point of support from said arm.

7. A welding machine comprising a substantially vertical main pedestal having a horizontally overhanging arm extending from the upper end thereof, a lower horizontal arm connected with the main pedestal, an electrode disposed at an angle to the main pedestal and carried thereby, an angle bracket secured to the end of the overhanging arm, electrode actuating mechanism connected with the bracket and arranged for rectilinear movement along a line forming an angle to the main pedestal corresponding to the angle of the lower electrode and a coacting electrode carried by the actuating mechanism.

8. A welding machine comprising spaced arms, fixed and movable electrodes connected with said arms and having a rectilinear movement of approach and separation along a line forming an angle with the vertical, together with an exchangeable bracket between the movable electrode and its arm.

9. A welding machine comprising a substantially vertically extending main pedestal having a horizontally extending arm at the upper end thereof, an electrode supported by said pedestal at a point below said arm, an upper electrode arranged to cooperate with said lower electrode, and an adapter securable to said pedestal arm and arranged to support said upper electrode for movement along a welding axis angularly disposed with respect to the vertical.

In testimony whereof he hereunto affixes his signature.

JAMES J. PAUGH.